(12) United States Patent
Yoshida et al.

(10) Patent No.: US 6,710,479 B2
(45) Date of Patent: Mar. 23, 2004

(54) COOLING STRUCTURE OF GENERATOR

(75) Inventors: Shiro Yoshida, Kanagawa (JP); Hiroshi Ogita, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 10/203,108

(22) PCT Filed: Dec. 11, 2001

(86) PCT No.: PCT/JP01/10853
§ 371 (c)(1),
(2), (4) Date: Aug. 6, 2002

(87) PCT Pub. No.: WO02/49193
PCT Pub. Date: Jun. 20, 2002

(65) Prior Publication Data
US 2003/0075996 A1 Apr. 24, 2003

(30) Foreign Application Priority Data
Dec. 11, 2000 (JP) .................................. 2000-375990

(51) Int. Cl.[7] ................................................ H02K 9/19
(52) U.S. Cl. .............................. 310/52; 310/54; 310/58; 310/60 A
(58) Field of Search .................... 310/52, 54, 58, 310/60 A

(56) References Cited

U.S. PATENT DOCUMENTS

| | | | | |
|---|---|---|---|---|
| 926,086 A | * | 6/1909 | Behrend | 310/63 |
| 1,269,537 A | * | 6/1918 | Holcombe | 310/63 |
| 1,487,221 A | * | 3/1924 | Ehrmann | 310/58 |
| 1,761,587 A | * | 6/1930 | Ringland | 310/63 |
| 2,285,960 A | * | 6/1942 | Fechheimer | 310/54 |
| 2,915,655 A | * | 12/1959 | Baudry | 310/55 |
| 3,217,193 A | * | 11/1965 | Rayner | 310/54 |
| 3,648,085 A | * | 3/1972 | Fujii | 310/54 |
| 3,784,851 A | * | 1/1974 | Fujii | 310/58 |

FOREIGN PATENT DOCUMENTS

| | | |
|---|---|---|
| EP | 0503093 A1 | 9/1992 |
| EP | 0581966 A1 | 2/1994 |
| JP | 60-102827 | 6/1985 |
| JP | 4-145859 | 5/1992 |
| JP | 5-236705 | 9/1993 |
| JP | 11-69721 | 3/1999 |
| JP | 2000-116061 | 4/2000 |

* cited by examiner

Primary Examiner—Thomas M. Dougherty
Assistant Examiner—David W. Scheuermann
(74) Attorney, Agent, or Firm—Wenderoth, Lind & Ponack, L.L.P.

(57) ABSTRACT

Cooling oil passes through a cooling oil passage (28) on the inside of an iron core (7), and cools the inside of the iron core (7). Further, cooling air passes through a cooling air passage (31) in the inside of the iron core (7) and a clearance (5) between the internal periphery of the iron core (7) and the external periphery of a rotor (4), and cools the inside of the iron core (7) and the rotor (4). Therefore, it is possible to effectively cool the internal periphery side of a stator (6) and the rotor (4). When a cooling oil is sprayed from the cooling oil passage (28) into the cooling air passage (31), it is possible to obtain a more effective cooling effect by utilizing the latent heat of vaporization of the mist of the cooling oil.

9 Claims, 15 Drawing Sheets

COOLING STRUCTURE OF GENERATOR

TECHNICAL FIELD

The present invention relates to a generator having a high-speed rotor and a cooling structure that effectively cools the generator.

BACKGROUND ART

A generator will be explained below with reference to FIG. 13 to FIG. 15. An example of the generator that uses a compact gas turbine as a motor will be explained.

In the figures, 1 denotes a generator. This generator 1 comprises a casing 2, a rotor 4 that is accommodated in the casing 2 and is rotatably supported by a bearing 3 in the casing 2, and a stator 6 that is accommodated in the casing 2 and is disposed with a clearance 5 around the external surrounding of the rotor 4.

The rotor 4 is structured by a permanent magnet such as samarium cobalt. The stator 6 is constructed of an iron core 7 having a lamination of a large number of steel sheets (for example, silicon steel sheets having a thickness of about 0.15 mm), and a coil 8 wound around the iron core 7. At the center of the iron core 7, there are provided a circular through hole 15 and a plurality of long grooves 16 in a radial shape to continue to the through hole 15. In the through hole 15, the rotor 4 is inserted with a slight clearance 5. The coil 8 is disposed in the long grooves 16.

In the casing 2, there are provided a cooling oil entrance 9, a cooling oil exit 10, and a cooling oil passage 11 that is communicated to the cooling oil entrance 9 and the cooling oil exit 10 and that passes through the external periphery of the stator 6. The cooling oil passage 11 is constructed of a branched radial portion that is communicated to the cooling oil entrance 9, a ring portion that passes through the eternal periphery of the stator 6, and a branched radial portion that is communicated to the cooling oil exit 10. The casing 2 is provided with a lubricating oil entrance 12, a lubricating oil exit 13, and a lubricating oil passage 14 that is communicated to the lubricating oil entrance 12 and the lubricating oil exit 13 and that lubricates the bearing 3.

In the figures, 17 denotes a compact gas turbine that is what is called a micro gas turbine. This compact gas turbine 17 comprises a rotary shaft 20 that is rotatably supported by high-speed bearings 19 in a casing 18, and a compressor side impeller 21 and a turbine side wheel 22 that are fixed to the rotary shaft 20.

The compact gas turbine 17 is provided with a combustor 23 and a regeneration heat exchanger 24. A coupling 25 is disposed between the rotor 4 of the generator 1 and the rotary shaft 20 of the compact gas turbine 17.

The operation of the generator 1 and the compact gas turbine 17 will next b explained.

The compact gas turbine 17 is started by a starting motor incorporated in the generator 1 or a driving motor (not shown). Then, the rotary shaft 20, the compressor side impeller 21 and the turbine side wheel 22 are rotated. Along these rotations, the atmospheric air (shown by a one-point chain line arrow mark in FIG. 13) is taken in and compressed by the compressor side impeller 21. The compressed air (shown by a solid line arrow mark in FIG. 13) is mixed with fuel (such as a town gas, for example), and is combusted by the combustor 23. This combustion gas (shown by a dotted line arrow mark in FIG. 13) rotates the turbine side wheel 22, is heat-exchanged with the compressed air by the regeneration heat exchanger 24, and is discharged to the atmosphere.

When the turbine side wheel 22 rotates at a high speed, the rotary shaft 20 rotates at a high speed. The high-speed rotation of the rotary shaft 20 is decelerated via the coupling 25, and is transmitted to the rotor 4 of the high-speed generator 1. When the rotor 4 rotates at a high speed, for example, at about 50,000 to about 80,000 rpm, the generator 1 carries out power generation.

On the other hand, in the generator 1, cooling oil (shown by a one-point chain line in FIG. 14) has been supplied to the cooling oil entrance 9, and lubricating oil (shown by a two-point chain line in FIG. 14) has been supplied to the lubricating oil entrance 12, respectively. The cooling oil passes through the cooling oil passage 11 and the external periphery of the stator 6 from the cooling oil entrance 9, thereby cooling the external periphery side of the stator 6, and is discharged to the outside from the cooling oil exit 10. Further, the lubricating oil passes through the lubricating oil passage 14 from the lubricating oil entrance 12, thereby lubricating the bearing 3 and the like, and is discharged to the outside from the lubricating oil exit 13.

In the generator 1, based on its structure, lost energy is accumulated as heat on the inside. In other words, when the rotor 4 rotates at a high speed, a high frequency is generated, and an eddy current is generated. Based on this, the rotor 4 and the stator 6 are heated. When the temperature of the rotor 4 and the stator 6 rise, a magnetic flux declines and power generation efficiency is lowered. Therefore, it is necessary to cool the rotor 4 and the stator 6 in the generator 1. Incidentally, when the power generation capacity of the generator 1 exceeds about 50 kw or more, for example, the temperature of the rotor 4 and the stator 6 become about 150 to 180° C. when the temperature of the open air is about 50° C. Therefore, it is necessary to cool the rotor 4 and the stator 6 to a temperature of about 140° C. or below as described above.

However, according to the cooling structure of the conventional generator 1, the cooling oil passage 11 is provided between the internal periphery of the casing 2 and the external periphery of the stator 6. Therefore, it is possible to cool the external periphery side of the stator 6 with the cooling oil but it is difficult to cool the internal periphery side of the stator 6 and the rotor 4. As a result, there is a problem that it is not possible to obtain an effective cooling effect.

Therefore, this invention has an object of providing a generator cooling structure that effectively cools the generator.

DISCLOSURE OF THE INVENTION

According to the present invention, a casing is provided with a cooling oil entrance and a cooling oil exit. On the other hand, an iron core is provided with a cooling oil passage that passes through the inside of the iron core and is communicated between the cooling oil entrance and the cooling oil exit.

As a result, according to this invention, based on the cooling oil passage that passes through the inside of the iron core, the cooling oil passes through the inside of the iron core to cool the inside of the iron core. Therefore, it is possible to effectively cool the internal periphery side of the stator and the rotor.

Further, according to the present invention, a casing is provided with a cooling air entrance and a cooling air exit. On the other hand, an iron core is provided with a cooling air passage that passes through the inside of the iron core and is communicated between the cooling air entrance and the cooling air exit via a clearance between the internal periphery of the iron core and the external periphery of the rotor.

As a result, according to this invention, based on the cooling air passage, cooling air passes through the inside of the iron core and the clearance between the internal periphery of the iron core and the external periphery of the rotor to cool the inside of the iron core and the rotor. Therefore, it is possible to effectively cool the internal periphery side of the stator and the rotor.

Further, according to this invention, as the cooling air cools the external periphery of the rotor, the cooling oil does not easily enter the external periphery of the rotor due to the centrifugal force of the rotor, as compared with when the cooling oil cools the external periphery of the rotor. Therefore, there is no possibility that the cooling oil passage is corroded. Further, as compared with the cooling oil, there is no risk that the rotation resistance of the rotor becomes large due to loss of the rotor rotation because of the stirring of the cooling oil.

Further, according to the present invention, a casing is provided with a cooling oil entrance, a cooling oil exit, a cooling air entrance, and a cooling air exit. On the other hand, an iron core is provided with a cooling oil passage that passes through the inside of the iron core and is communicated between the cooling oil entrance and the cooling oil exit, and a cooling air passage that passes through the inside of the iron core and is communicated between the cooling air entrance and the cooling air exit via the clearance between the internal periphery of the iron core and the external periphery of the rotor.

As a result, according to this invention, based on the cooling oil passage that passes through the inside of the iron core, the cooling oil passes through the inside of the iron core to cool the inside of the iron core. Further, based on the cooling air passage, the cooling air passes through the inside of the iron core and the clearance between the internal periphery of the iron core and the external periphery of the rotor to cool the inside of the iron core and the rotor. Therefore, it is possible to effectively cool the internal periphery side of the stator and the rotor.

Further, according to this invention, as the cooling air cools the external periphery of the rotor, the cooling oil does not easily enter the external periphery of the rotor due to the centrifugal force of the rotor, as compared with when the cooling oil cools the external periphery of the rotor. Therefore, there is no possibility that the cooling oil passage is corroded. Further, as compared with the cooling oil, there is no risk that the rotation resistance of the rotor becomes large due to loss of rotor rotation because of the stirring of the cooling oil.

Further, according to this invention, cooling oil is sprayed from the cooling oil passage into the cooling air passage, and therefore it is possible to obtain a more effective cooling effect by utilizing the latent heat of vaporization of the mist of the cooling oil.

Further, according to the present invention, a cooling oil passage and a cooling air passage are formed by combining several kinds of steel sheets provided by press processing several kinds of holes and/or grooves.

As a result, according to this invention, it is possible to easily form an optional cooling oil passage and an optional cooling air passage based on simple press processing.

BEST MODE FOR CARRYING OUT THE INVENTION

One embodiment of the generator and the cooling structure relating to the present invention will be explained below with reference to FIG. 1 to FIG. 12. It should be noted that the cooling structure in the generator is not limited by this embodiment.

(Explanation of the Structure of the Embodiment)

Figure 13:
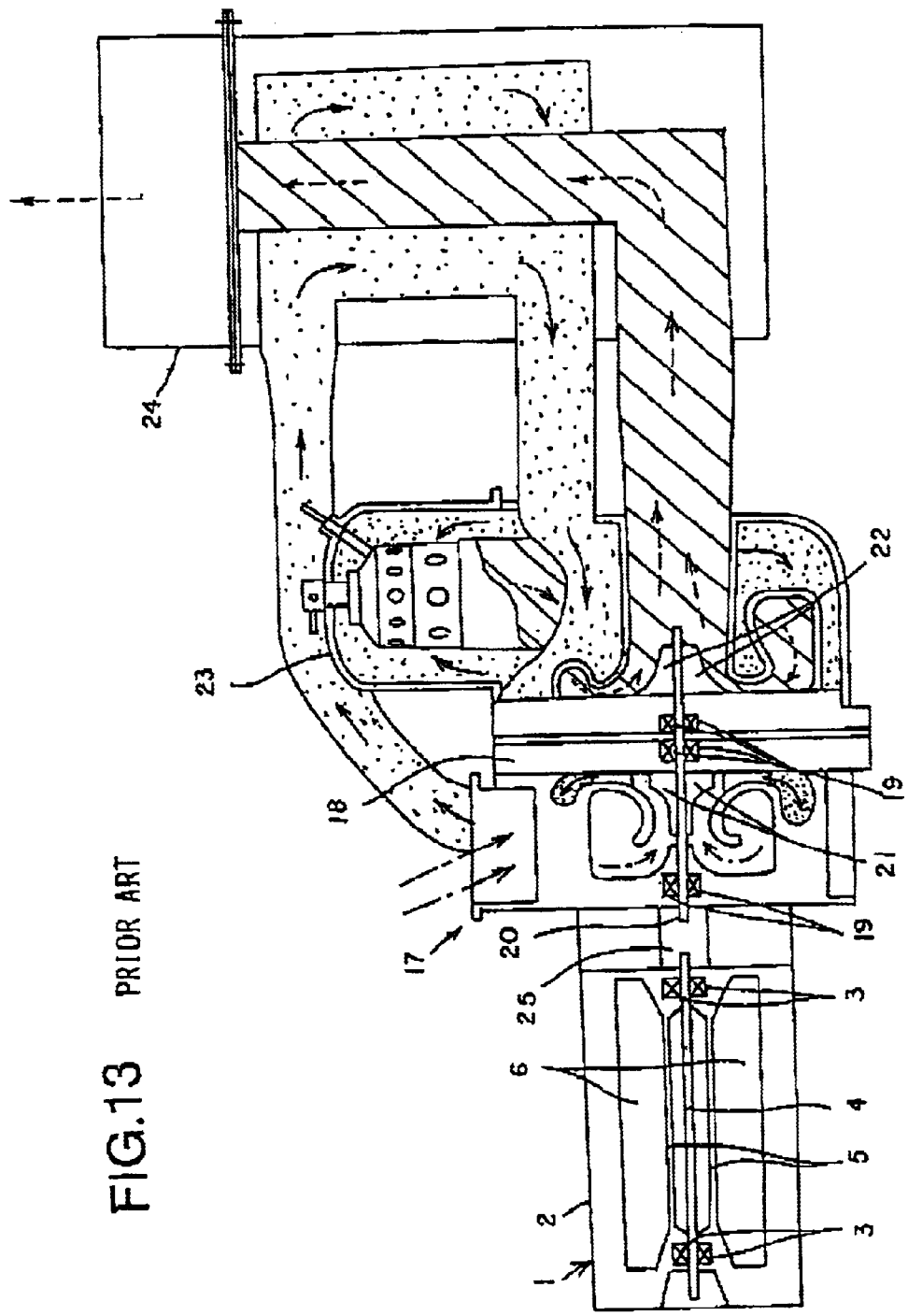
FIG. 13 is an explanatory view which shows a generator having a motor as a compact gas turbine.
Figure 14:
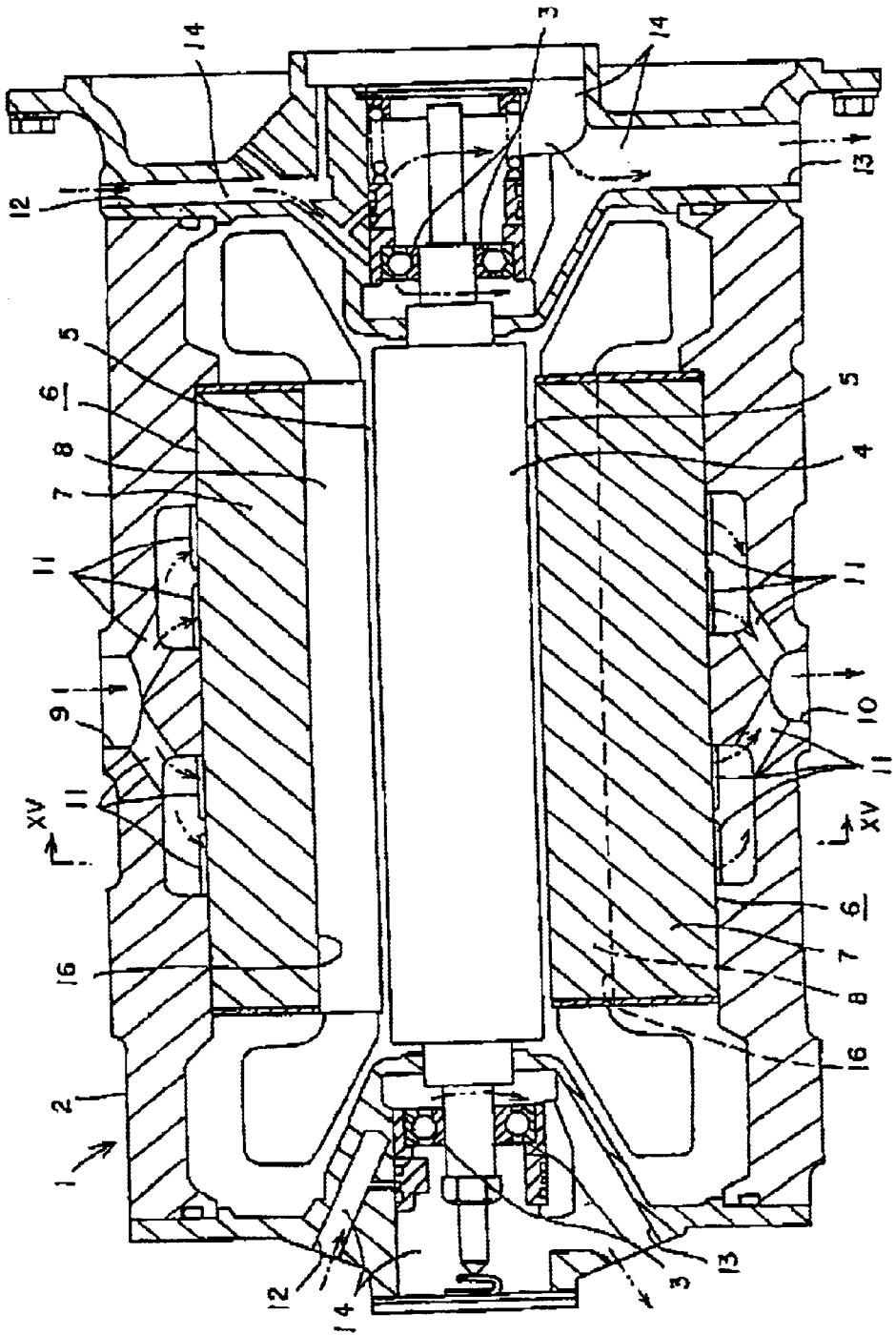
FIG. 14 is a longitudinal sectional view which shows a cooling structure in a conventional generator.
Figure 15:
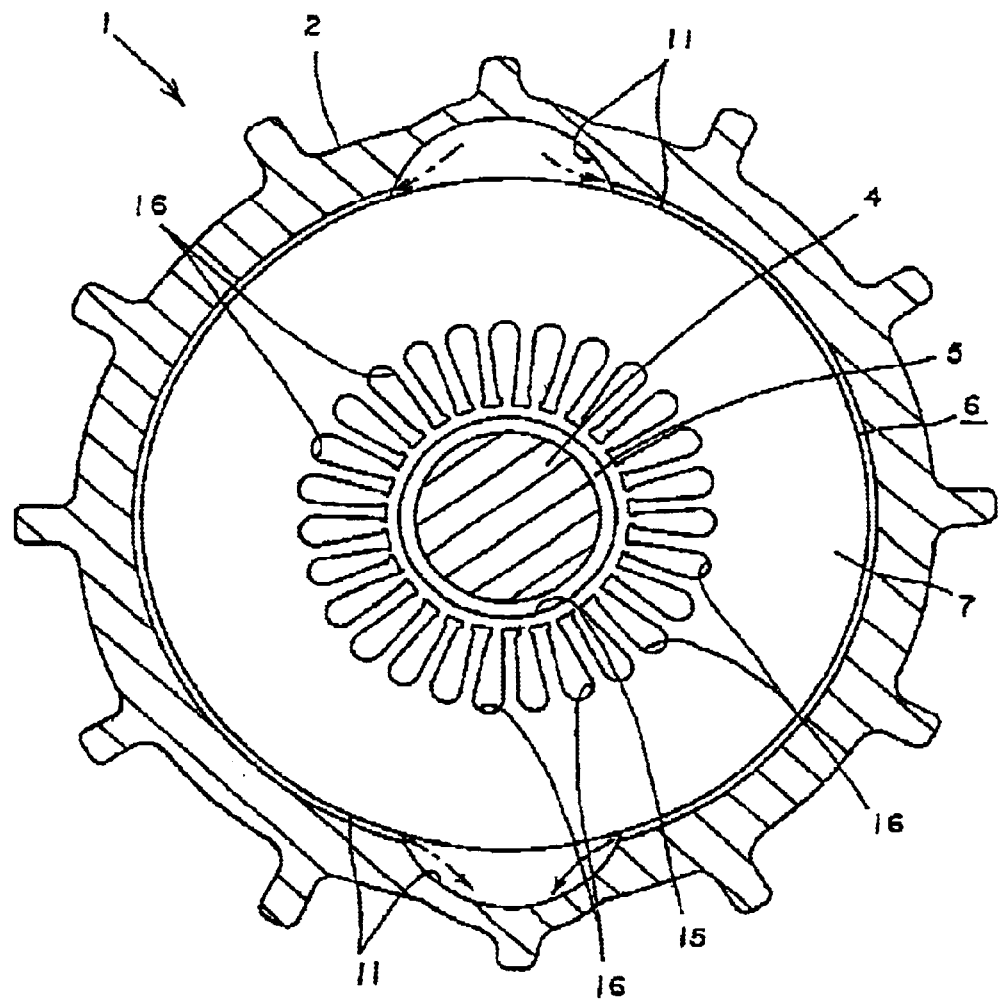
FIG. 15 is a sectional view cut along line XV—XV in FIG. 14.

FIG. 1 to FIG. 9 show an embodiment of the cooling structure in a generator relating to this invention. In the figures, symbols that are the same as those in FIG. 13 to FIG. 15 show the same items.

Figure 4:
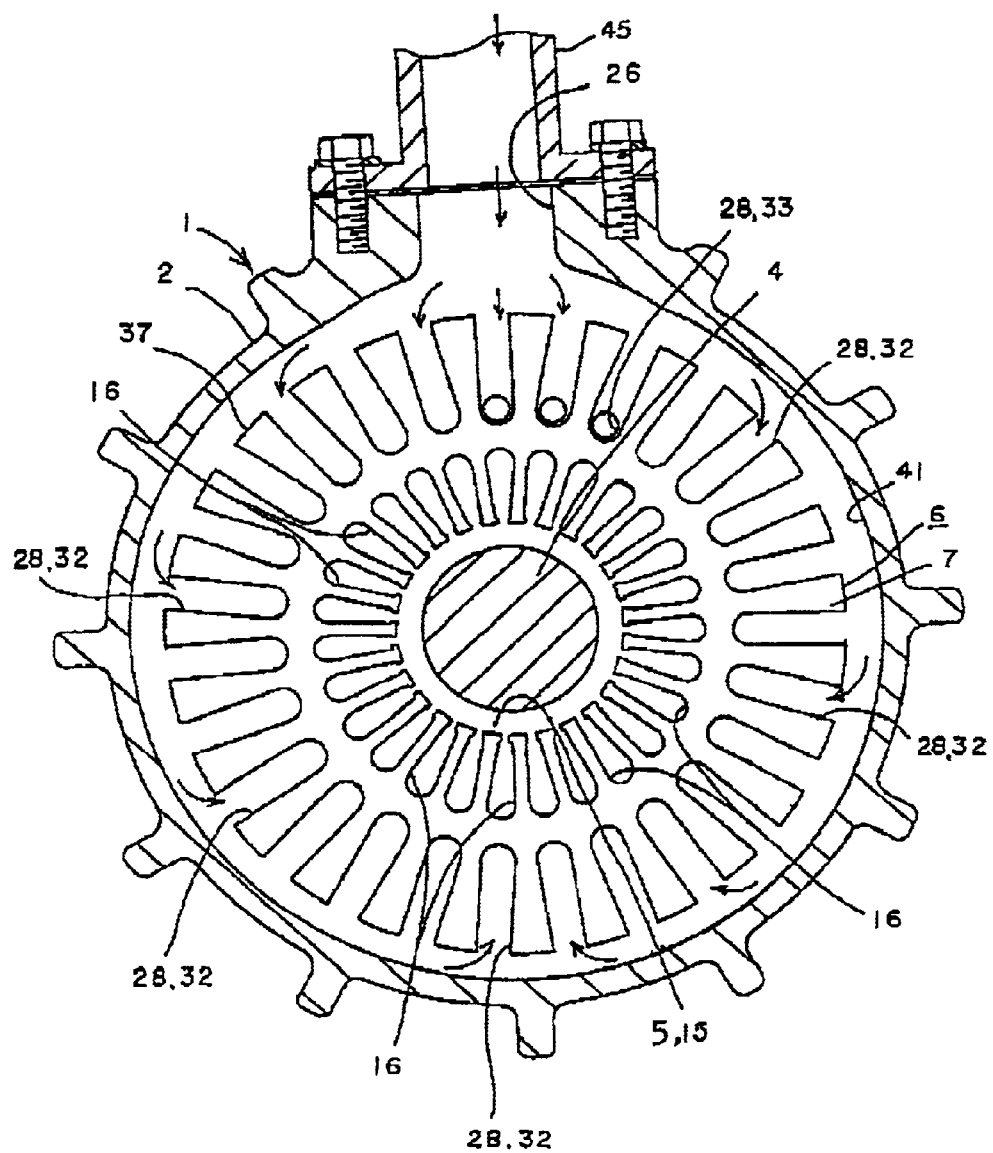
FIG. 4 is a sectional view cut along line IV—IV in FIG. 2.
Figure 8:
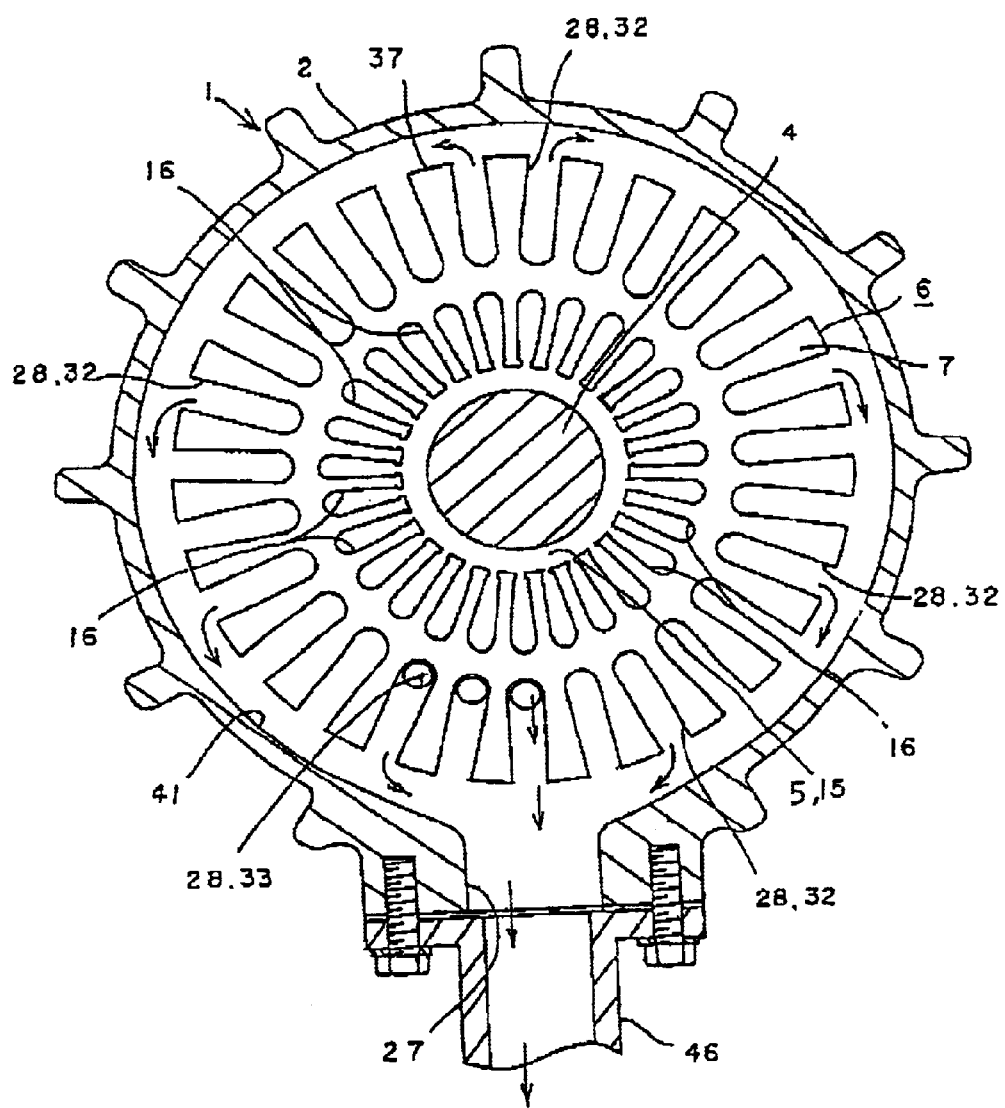
FIG. 8 is a sectional view cut along line VIII—VIII in FIG. 2.
Figure 9:
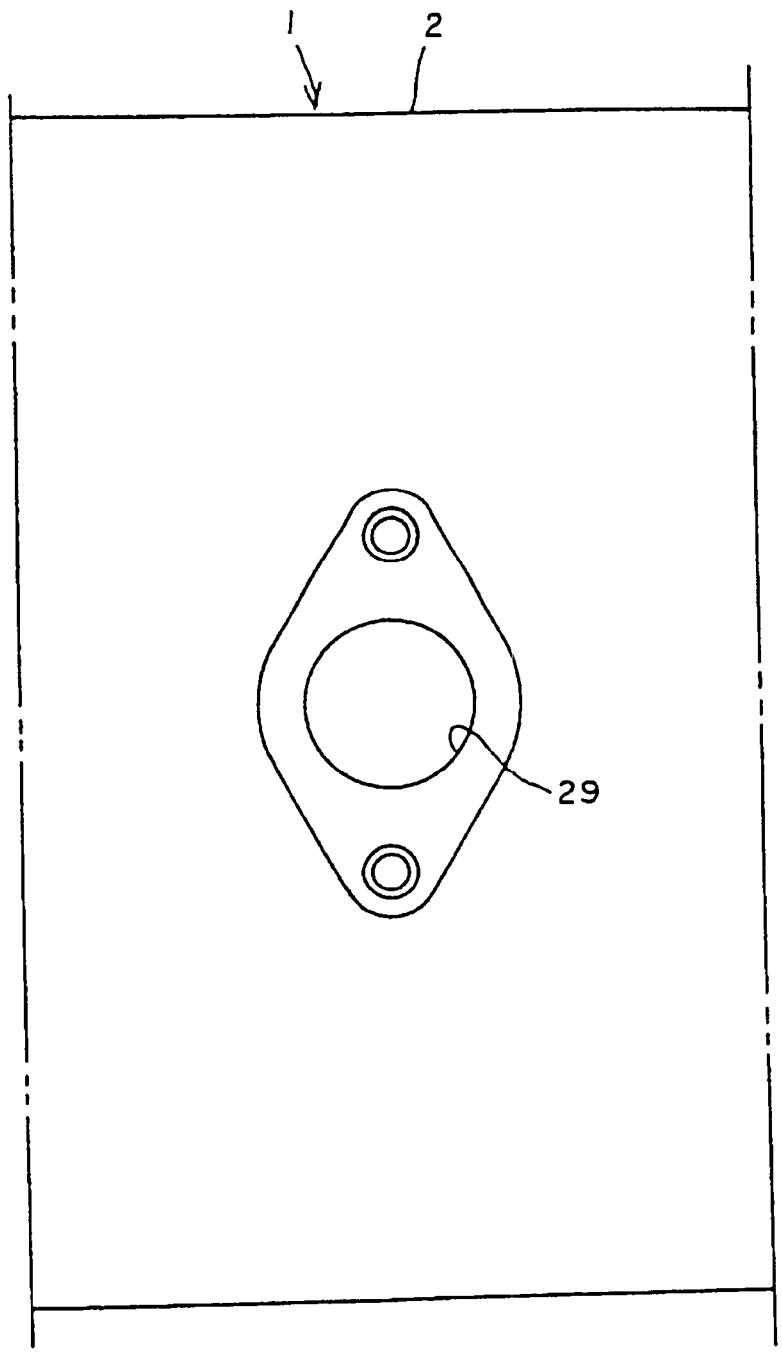
FIG. 9 is an arrow directional view cut along line IX—IX in FIG. 6 and FIG. 7.

A cooling oil entrance 26 is provided at an upper portion of one end portion (a left end portion in FIG. 1) of a casing 2, and on the other hand, a cooling oil exit 27 is provided at a lower portion of the other end portion (a right end portion in FIG. 1) of the casing 2. Further, on the internal peripheral surfaces of both end portions of the casing 2, two annular cooling oil passages 41 are provided to be communicated to the cooling oil entrance 26 and the cooling oil exit 27, respectively. As shown in FIG. 4 and FIG. 8, a cooling oil supply pipe 45 and a cooling oil discharge pipe 46 are connected to the cooling oil entrance 26 and the cooling oil exit 27, respectively.

On the other hand, in the iron core 7, there is provided a cooling oil passage 28 that passes through the inside of the iron core 7 and is communicated between the cooling oil entrance 26 and the cooling oil exit 27. The cooling oil entrance 26, the cooling oil exit 27, the cooling oil passage 28, and the annular cooling oil passages 41 are separate from the cooling oil entrance 9, the cooling oil exit 10, and the cooling oil passage 11 shown in FIG. 13 to FIG. 15.

A cooling air entrance 29 and two cooling air exits 30 are provided at an intermediate portion and at both end portions of the casing 2, respectively. Further, on the internal peripheral surface of the intermediate portion of the casing 2, there is provided an angular cooling air passage 42 that is communicated to the cooling air entrance 29. The two cooling air exits 30 at both end portions of the casing 2 are communicated to a space 44 that accommodates an end of the coil 8. A cooling air supply pipe (not shown) and a cooling air discharge pipe (not shown) are connected to the cooling air entrance 29 and the cooling air exit 30.

On the other hand, in the iron core 7, there is provided a cooling air passage 31 that passes through the inside of the iron core 7 and is communicated between the cooling air entrance 29 and the cooling air exit 30 via a clearance 5 between the internal periphery of the iron core 7 and the external periphery of the rotor 4.

The cooling oil passage 28 and the cooling air passage 31 are formed by combining five kinds of steel sheets 36, 37, 38, 39, and 40 having the kinds of through holes 15, 33, and 34 and/or four kinds of long grooves 16, 32, 35, and 43 provided by press processing.

Figure 1:
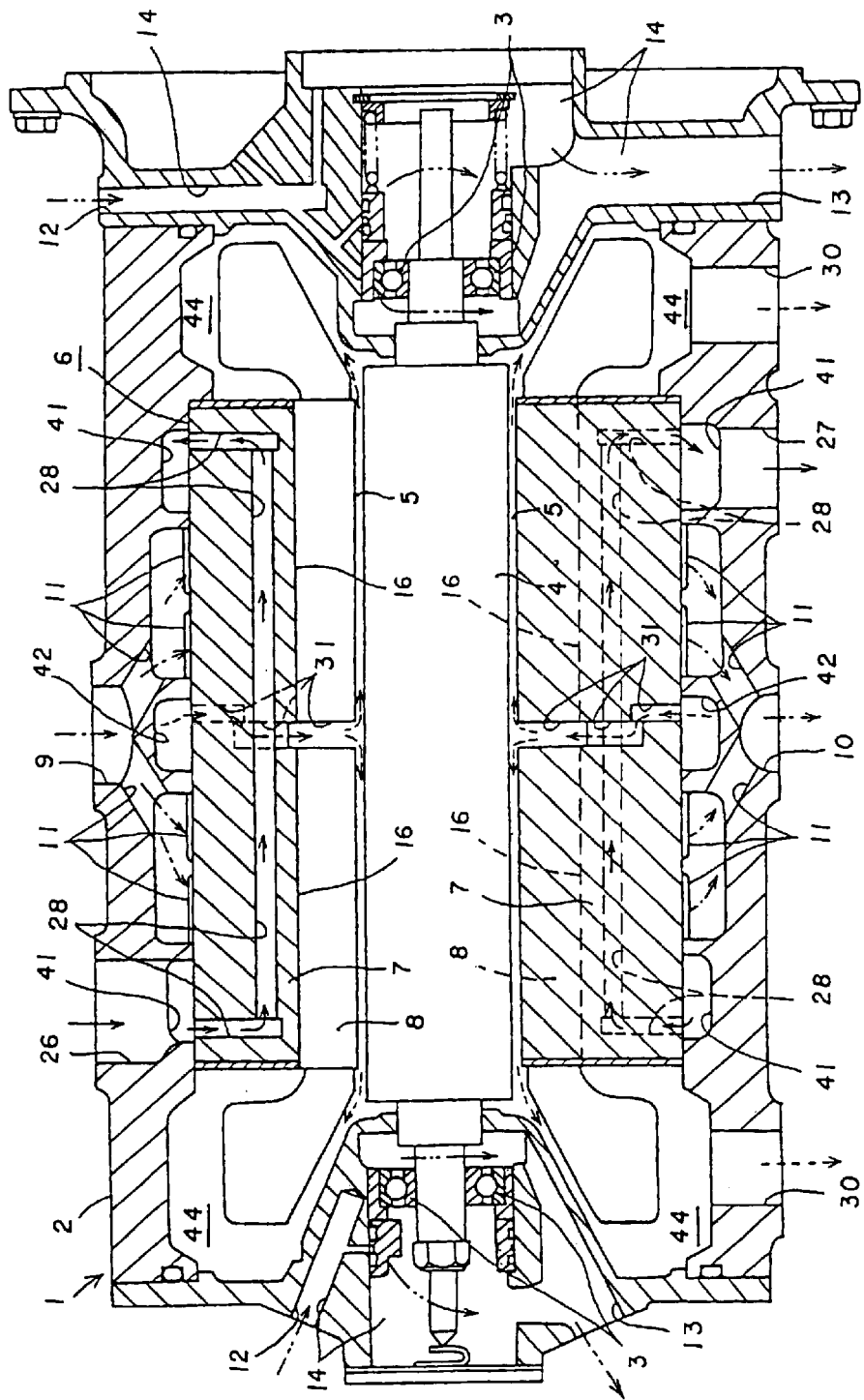
FIG. 1 is a longitudinal sectional view which shows one embodiment of a cooling structure in the generator of this invention.
Figure 2:
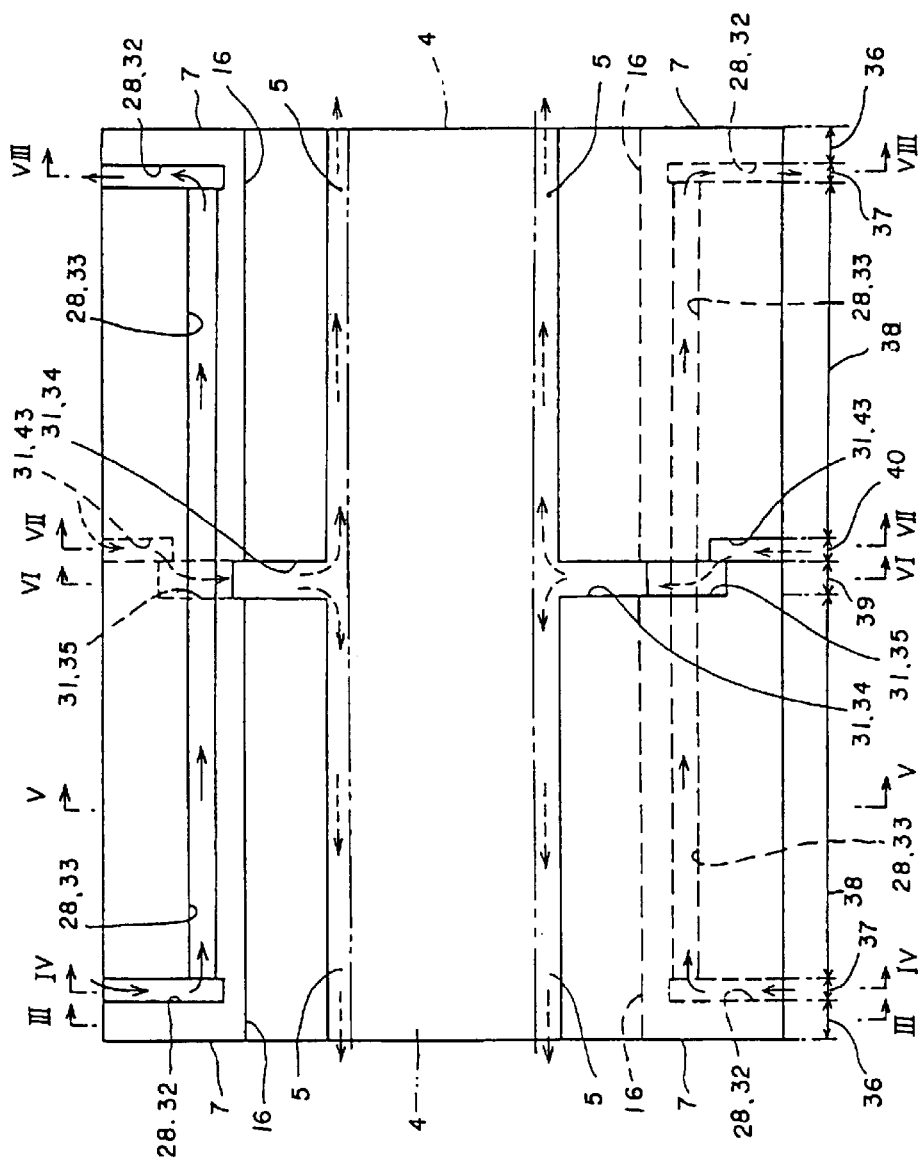
FIG. 2 is an explanatory view of a cooling oil passage and a cooling air passage which show flows of a cooling oil and cooling air.
Figure 3:
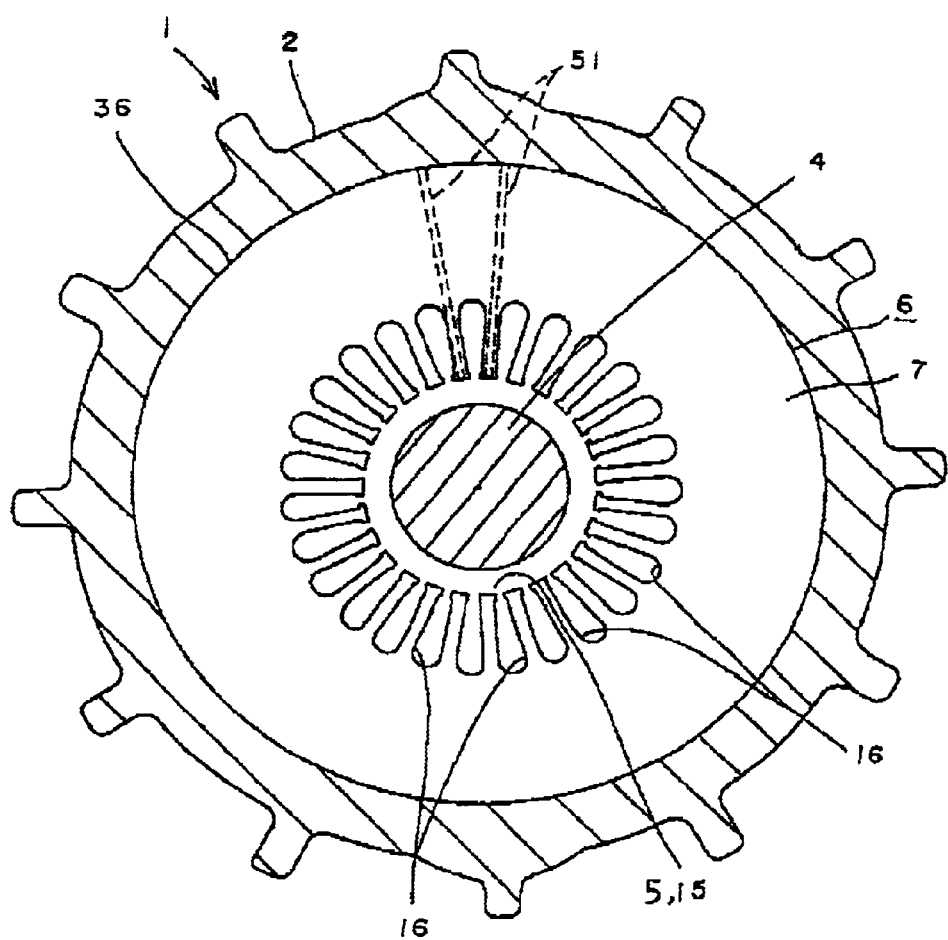
FIG. 3 is a sectional view cut along line III—III in FIG. 2.

In other words, the first steel sheet 36 is formed by press processing the circular through hole 15 provided at the center and the plurality of long grooves 16 provided in a radial shape from the through hole 15, as shown in FIG. 3, that is, in a similar manner to that of the iron core 7 shown in FIG. 13 to FIG. 15. This first steel sheet 36 is used for end plates at both ends.

The second steel sheet 37 is formed, as shown in FIG. 4 and FIG. 8, by press processing the circular through hole 15 provided at the center, the plurality of long grooves 16 provided in a radial shape from the through hole 15, and the plurality of long grooves 32 provided in a radial shape from the external edge. This second steel sheet 27 is used to form the cooling oil passage 28 in a radial direction. In FIG. 4 and FIG. 8, the three small circular through holes 33 that are communicated to the long grooves 32 are shown.

Figure 5:
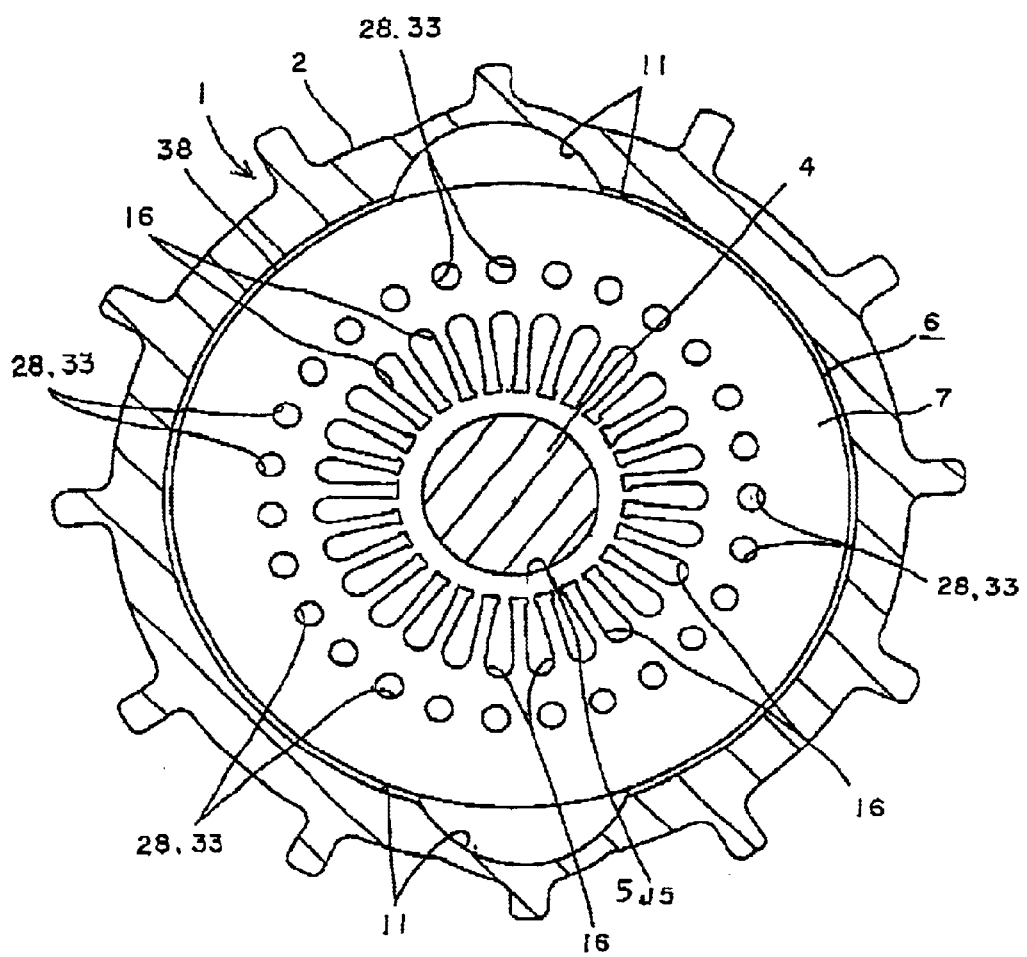
FIG. 5 is a sectional view cut along line V—V in FIG. 2.

The third steel sheet 38 is formed, as shown in FIG. 5, by press processing the circular through hole 15 provided at the center, the plurality of long grooves 16 provided in a radial shape from the through hole 15, and the plurality of small circular through holes 33 provided corresponding to the bottom portion of the long grooves 32 substantially at an intermediate position. This third steel sheet 38 is used to form the cooling oil passage 28 in an axial direction.

Figure 6:
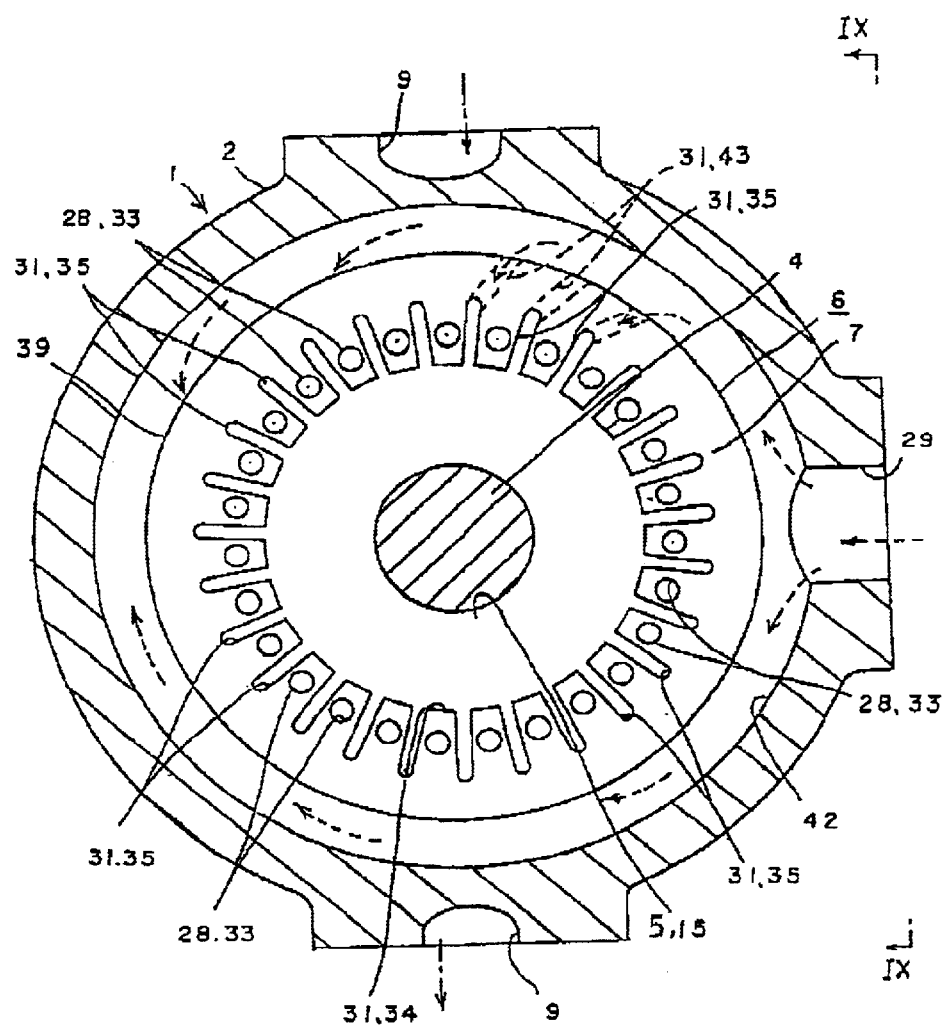
FIG. 6 is a sectional view cut along line VI—VI in FIG. 2.

The fourth steel sheet 39 is formed, as shown in FIG. 6, by press processing the large circular through hole 34 provided at the center, the plurality of long grooves 35 provided in a radial shape from the through hole 34, and the plurality of small circular through holes 33 provided between the long groove 35 and the long groove 35 substantially at an intermediate position. This fourth steel sheet 39 is used to form the cooling oil passage 28 in an axial direction and to form the cooling air passage 31 in a radial direction. In FIG. 6, the circular through hole 15 provided at the center is shown, and the three long grooves 43 that arm communicated to the long grooves 35 are also shown.

Figure 7:
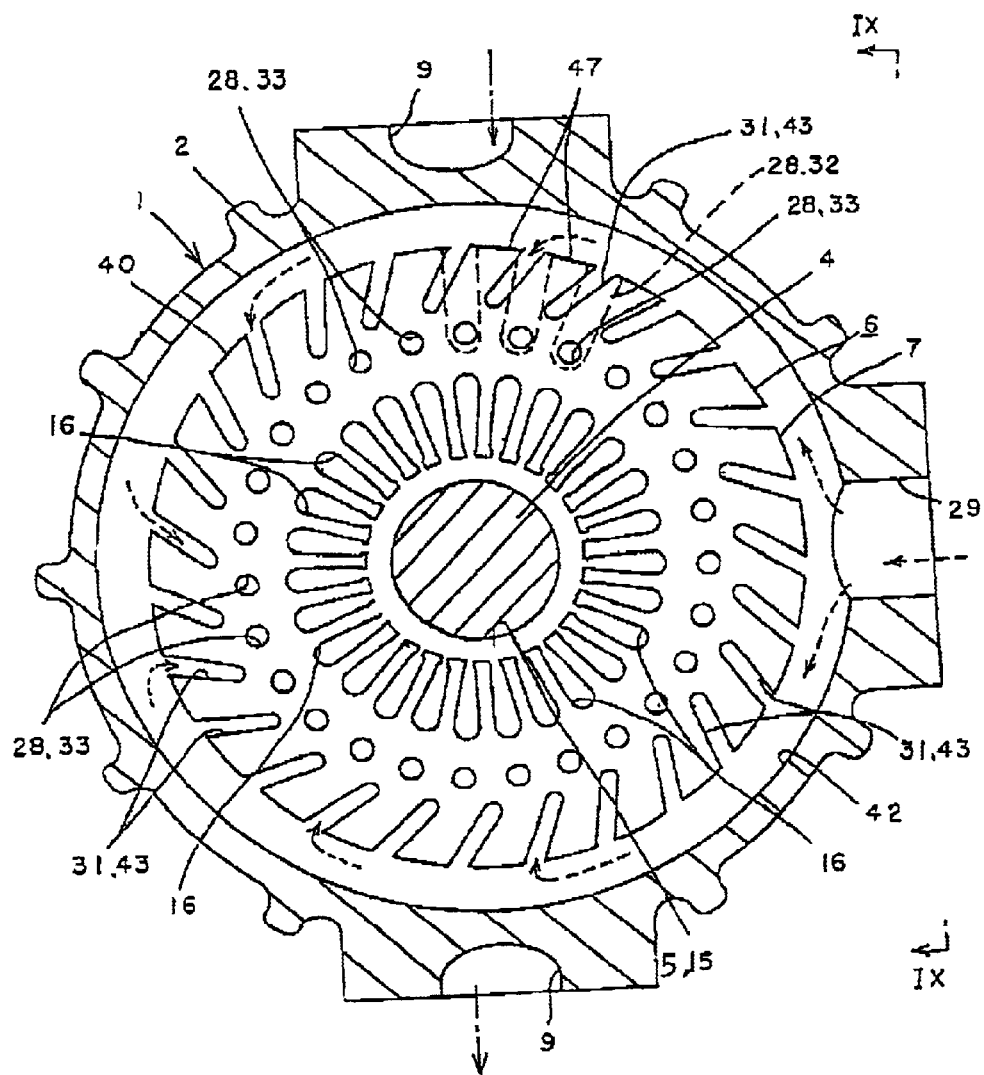
FIG. 7 is a sectional view cut along line VII—VII in FIG. 2.

The fifth steel sheet 40 is formed, as shown in FIG. 7, by press processing the circular through hole 15 provided at the center, the plurality of long grooves 16 provided in a radial shape from the through hole 15, the plurality of small circular through holes 33 provided substantially at an intermediate position, and the plurality of long grooves 43 provided in a slanted radial shape from the external edge. This fifth steel sheet 40 is used to form the cooling oil passage 28 in an axial direction and to form the cooling air passage 31 in a radial direction. In FIG. 7, the three long grooves 32 that are communicated to the through hole 33 are shown.

As explained above, the cooling oil passage 28 is formed with the long groove 32 of the second steel sheet 37, and with the through holes 33 of the third steel sheet 38, the fourth steel sheet 39, and of the fifth steel sheet 40. Further, the cooling air passage 31 is formed with the through hole 34 and the long grooves 35 of the fourth steel sheet 39, and the long grooves 43 of the fifth steel sheet 40. Further, the iron core 7 is formed by having a large number of the first to fifth steel sheets 36 to 40 laminated together.

(Explanation of the Operation in the Embodiment)

The cooling structure in the generator relating to this embodiment has the above structure, and the operation of this structure will be explained below.

The cooling oil (shown by a solid line arrow mark in FIG. 1 and FIG. 2) is supplied to the cooling oil entrance 26 via the cooling oil supply pipe 45. Then, the cooling oil passes through the annular cooling oil passage 41 of the casing 2 (the left side in FIG. 1 and FIG. 2), and passes through the cooling oil passage 28 inside the iron core 7 (that is, the cooling oil passage 28 consisting of the long grooves 32 of the second steel sheet 37, and the through holes 33 of the third steel sheet 38, the fourth steel sheet 39, and the fifth steel sheet 40), thereby cooling the inside of the iron core 7. The cooling oil that has cooled the inside of this iron core 7 passes through the annular cooling oil passage 41 of the casing 2 (the right side in FIG. 1 and FIG. 2), and is discharged from the cooling oil exit 27 to the cooling oil discharge pipe 46.

The cooling air (shown by a broken line arrow mark in FIG. 1 and FIG. 2) is supplied to the cooling air entrance 29 through the cooling air supply pipe. Then, the cooling air passes through the annular cooling air passage 42 of the casing 2, and passes through the cooling air passage 31 inside the iron core 7 (that is, the cooling air passage 31 consisting of the through hole 34 and the long grooves 35 of the fourth steel sheet 39, and the long grooves 43 of the fifth steel sheet 40), thereby cooling the inside of this iron core 7. Further, this cooling air passes through the clearance 5 between the internal periphery of the iron core 7 and the external periphery of the rotor 4, thereby cooling the inside of this iron core 7 and the rotor 4. The cooling air that has cooled the inside of this iron core 7 and the rotor 4 passes through the space 44 of the casing 2, and is discharged from the cooling air exit 30 to the cooling air discharge pipe.

The cooling oil is sprayed from the cooling oil passage 28 into the cooling air passage 31. Then, based on the latent heat of vaporization of the mist of this cooling oil, the insides of the iron core 7 and the rotor 4 are cooled a the similar manner to that with the cooling air. The cooling oil mist that has cooled the insides of the iron core 7 and the rotor 4 passes through the space 44 of the casing 2, and is discharged from the cooling air exit 30 to the cooling air discharge pipe, together with the cooling air.

The flow of other cooling oil (shown by a one-point chain line in FIG. 1) and the flow of lubricating oil (shown by a two-point chain line in FIG. 1) have been explained in FIG. 14 and FIG. 15, and therefore, their explanation will be omitted here.

(Explanation of the Effects of the Embodiment)

As the cooling structure in the generator relating to this embodiment has the above structure, it is possible to realize the following effects. In other words, according to the cooling structure of this embodiment, the cooling oil passes through the cooling oil passage 28 inside the iron core 7, and can cool the inside of this iron core 7. Therefore, it is possible to effectively cool the internal periphery side of the stator 6 and the rotor 4. For example, when cooling is carried out using only the cooling oil, it is possible to cool the rotor 4 and the stator 6 to a temperature of about 140-° C. or below. As the temperature of the rotor 4 and the stator 6 becomes about 140-° C. or below, there is no problem in the cooling oil that uses engine oil.

Further, according to the cooling structure of this embodiment, the cooling air passes through the cooling air passage 31 inside the iron core 7 and the clearance 5 between the internal periphery of the iron core 7 and the external periphery of the rotor 4, and can cool the inside of the iron core 7 and the rotor 4. Therefore, it is possible to effectively cool the internal periphery side of the stator 6 and the rotor 4. For example, when cooling is carried out using only the cooling air, it is possible to cool the rotor 4 and the stator 6 to a temperature of about 140-° C. or below.

Further, according to the cooling structure of this embodiment, as the cooling air cools the external periphery of the rotor 4, the cooling oil does not easily enter the external periphery of the rotor 4 due to the centrifugal force of the rotor 4, as compared with when the cooling oil cools the external periphery of the rotor 4. Therefore, there is no possibility that the cooling oil passage is corroded. Further, as compared with the cooling oil, there is no risk that the rotation resistance of the rotor 4 becomes large due to loss of rotation of the rotor 4 because of the stirring of the cooling oil.

Further, according to the cooling structure of this embodiment, cooling oil is sprayed from the cooling oil passage 28 into the cooling air passage 31, and it becomes possible to obtain a more effective cooling effect by utilizing the latent heat of vaporization of the mist of the cooling oil. For example, when cooling is carried out using the mist of the cooling oil, it is possible to cool the rotor 4 and the stator 6 to a temperature of about 120° C. or below.

Further, according to the cooling structure of this embodiment, the cooling oil passage 28 and the cooling air passage 31 are formed by combining the five kinds of steel sheets 36, 37, 38, 39, and 40 having the three kinds of through holes 15, 33, and 34 and/or the four kinds of long grooves 16, 32, 35, and 43 provided by press processing. As a result, it is possible to easily form the cooling oil passage 28 and the cooling air passage 31 based on simple press processing.

Particularly, according to the cooling structure of this embodiment while the long grooves 32 have been provided in the radial direction to form the cooling oil passage 28 on the second steel sheet 37, the long grooves 43 have been formed in the slanted direction to form the cooling air passage 31 on the fifth steel sheet 40. Therefore, as shown in FIG. 7, it is possible to make the opening edges of the long grooves 32 of the second steel sheet 37 coincide with the opening edges of the long grooves 43 of the fifth steel sheet 40. Based on this, in forming the iron core 7 by laminating a large number of the first to fifth steel sheets 36 to 40, it is possible to provide a welding 47 (shown by a thick line in FIG. 7) on the external periphery of the iron core 7.

(Modifications of the Embodiment)

Figure 10:
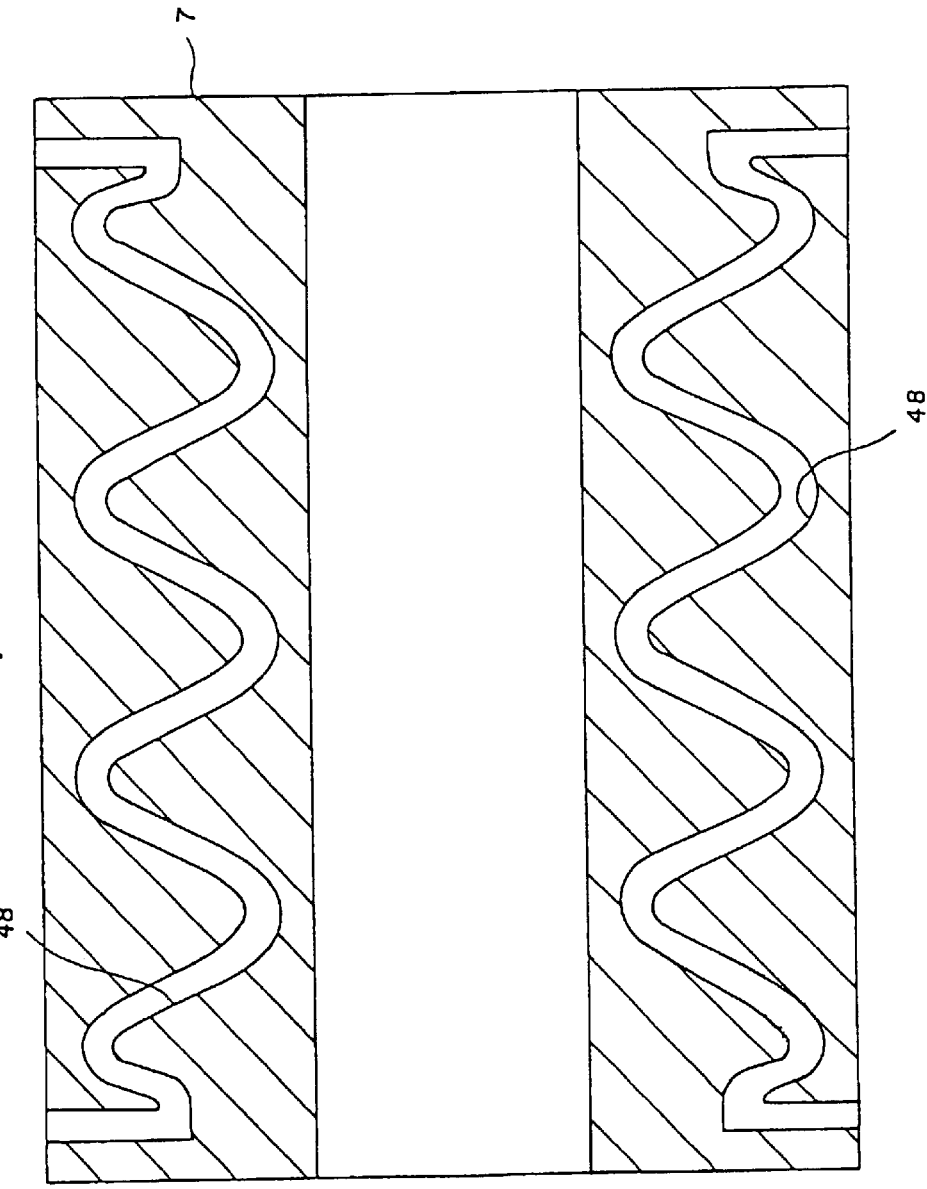
FIG. 10 is an explanatory view partially in section which shows a zigzag cooling oil passage.
Figure 11:
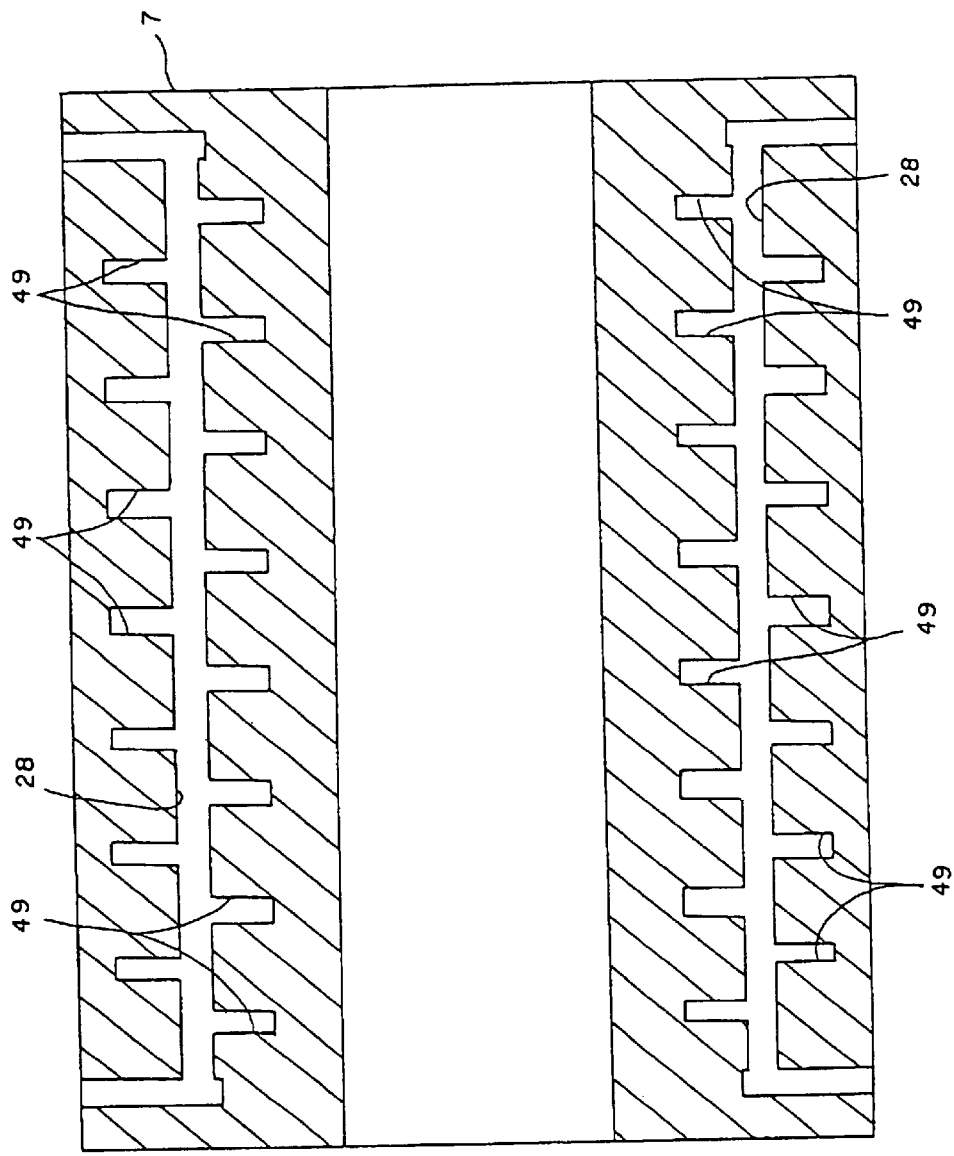
FIG. 11 is an explanatory view partially in section which shows a fin-shaped cooling oil passage.
Figure 12:
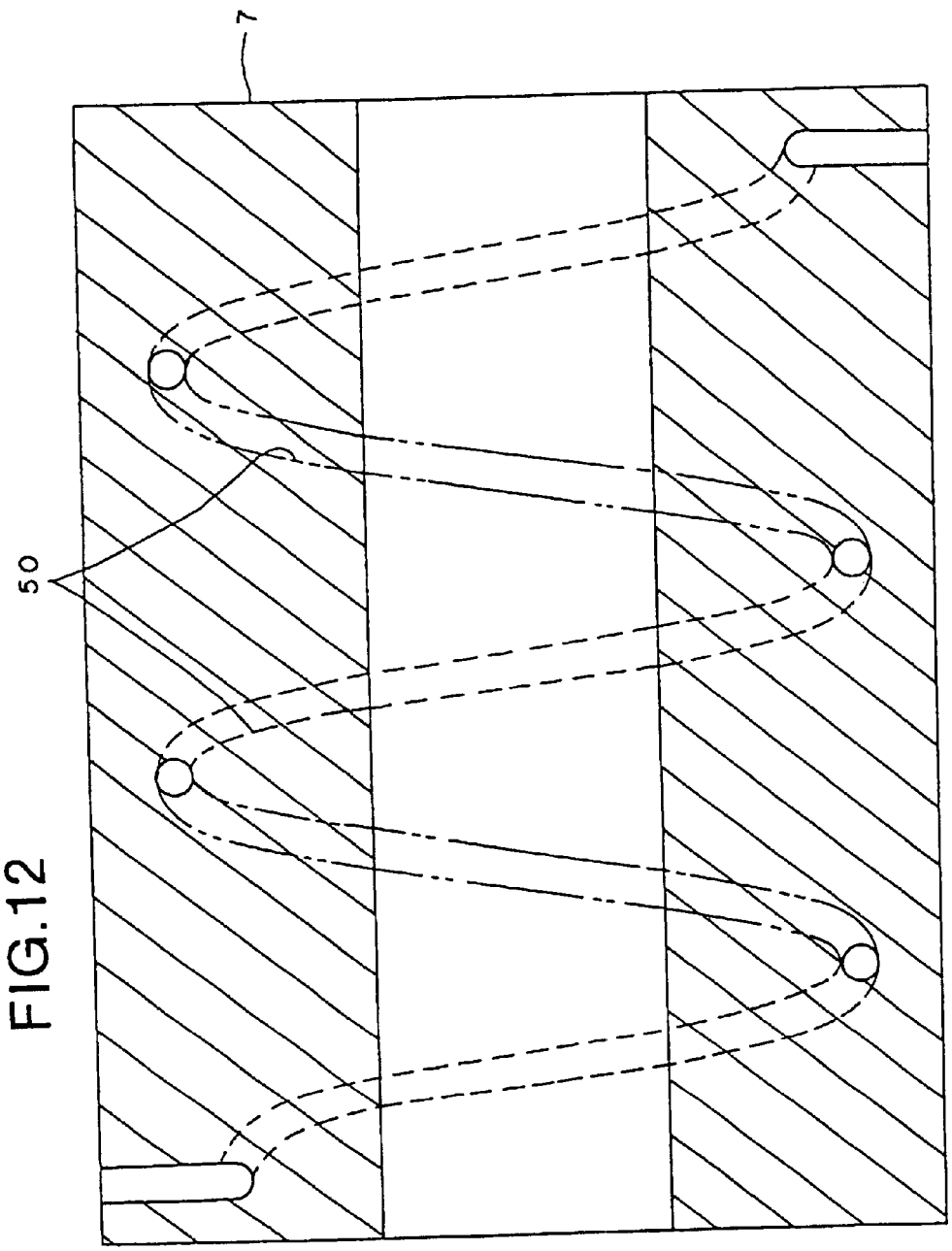
FIG. 12 is an explanatory view partially in section which shows a spiral cooling oil passage.

FIG. 10 to FIG. 12 are explanatory views partially in section which show modifications of the cooling oil passage. A cooling oil passage 48 shown in FIG. 10 is zigzag as compared with the straight cooling oil passage 28. A cooling oil passage shown in FIG. 11 is formed by providing a fin-shaped cooling oil passage 49 in an orthogonal cooling oil passage 28. Further, a cooling oil passage 50 shown in FIG. 12 is spiral.

Although the cooling oil passage 28 and the cooling air passage 31 are provided in the above embodiment, any one of the cooling oil passage 28 and the cooling air passage 31 may be provided in this invention.

Further, in this invention, the shapes of the cooling oil passages 28, 48, 49, and 50, and of the cooling air passage 31 are not particularly limited. For example, in the cooling air passage 31, the long grooves 51 for the cooling air passage may be provided to pass through between the long grooves 16 and also in the radial direction from the internal edge to the external edge of the iron core 7 (the steel sheet), as shown by a broken line in FIG. 3.

As is clear from the above, according to the generator and the cooling structure relating to this invention, the cooling oil passes through the cooling oil passage on the inside of the iron core to enable cooling of the inside of the iron core. Therefore, it is possible to effectively cool the internal periphery side of the stator and the rotor.

Further, according to the generator and the cooling structure relating to this invention, cooling air passes through the cooling air passage on the inside of the iron core and the clearance between the internal periphery of the iron core and the external periphery of the rotor to enable cooling of the inside of the iron core and the rotor. Therefore, it is possible to effectively cool the internal periphery side of the stator and the rotor.

Further, according to the generator and the cooling structure relating to this invention, as the cooling air cools the external periphery of the rotor, the cooling oil does not easily enter the external periphery of the rotor due to the centrifugal force of the rotor, as compared with when the cooling oil cools the external periphery of the rotor. Therefore, there is no possibility that the cooling oil passage is corroded. Further, as compared with the cooling oil, there is no risk that the rotation resistance of the rotor becomes large due to loss of rotor rotation because of the stirring of the cooling oil.

Further, according to the generator and the cooling structure relating to this invention, the cooling oil passes through the cooling oil passage on the inside of the iron core to enable cooling of the inside of the iron core. Further, the cooling air passes through the cooling air passage inside of the iron core and the clearance between the internal periphery of the iron core and the external periphery of the rotor to enable cooling of the inside of the iron core and the rotor. Therefore, it is possible to effectively cool the internal periphery side of the stator and the rotor.

Further, according to the generator and the cooling structure relating to this invention, as the cooling air cools the external periphery of the rotor, the cooling oil does not easily enter the external periphery of the rotor due to the centrifugal force of the rotor, as compared with when the cooling oil cools the external periphery of the rotor. Therefore, there is no possibility that the cooling oil passage is corroded. Further, as compared with the cooling oil, there is no risk that the rotation resistance of the rotor becomes large due to loss of rotor rotation because of the stirring of the cooling oil.

Further, according to the generator and the cooling structure relating to this invention, the cooling oil is sprayed from the cooling oil passage into the cooling air passage, and it is possible to obtain a more effective cooling effect by utilizing the latent heat of vaporization of the mist of the cooling oil.

Further, according to the generator and the cooling structure relating to this invention, the cooling oil passage and the cooling air passage are formed by combining several kinds of steel sheets provided by press processing several kinds of holes and/or grooves. Therefore, it is possible to easily form an optional cooling oil passage and an optional cooling air passage based on simple press processing.

As explained above, according to the generator and the cooling structure relating to the present invention, the structure is suitable to effectively cool a generator having a high-speed rotor.

What is claimed is:

1. A generator having a stator and a rotor that are cooled, the generator comprising a casing, the rotor accommodated in the casing and rotatably supported in the casing, and the stator accommodated in the casing and fixed with a clearance around the rotor, wherein the stator is constructed of an iron core having a plurality of steel sheets laminated, and a coil wound around the iron core, the casing is provided with a cooling oil entrance, a cooling oil exit, a cooling air entrance, and a cooling air exit, the iron core is provided with a cooling oil passage that passes through inside of the iron core and communicates between the cooling oil entrance and the cooling oil exit, and with a cooling air passage that passes through the inside of the iron core and communicates between the cooling air entrance and the cooling air exit via a clearance between an internal periphery of the iron core and an external periphery of the rotor, the cooling oil passage is constructed of a radial-direction cooling oil passage provided substantially in a radial direction, and an axial-direction cooling oil passage provided substantially in an axial direction, and the cooling air passage is constructed of a first radial direction cooling air passage that communicates with an external periphery of the iron core and a second radial-direction cooling air passage that communicates with an internal periphery of the iron core and another radial-direction cooling air passage provided in a section from an internal periphery of the iron core to the specific point.

2. The generator according to claim 1, wherein the cooling oil passage and the cooling air passage are formed by combining several kinds of the steel sheets provided by press processing any one or both of several kinds of holes and grooves.

3. A cooling structure which cools a stator and a rotor of a generator, wherein a casing of the generator is provided with a cooling oil entrance, a cooling oil exit, a cooling air entrance, and a cooling air exit, an iron core of the generator is provided with a cooling oil passage that passes through inside of the iron core and communicates between the cooling oil entrance and the cooling oil exit, and with a cooling air passage that passes through the inside of the iron core and communicates between the cooling air entrance and the cooling air exit via a clearance between an internal periphery of the iron core and an external periphery of the rotor, the cooling oil passage is constructed of a first radial-direction cooling oil passage provided substantially in a radial direction, and an axial-direction cooling oil passage provided substantially in an axial direction, and the cooling air passage is constructed of a first radial-direction cooling air passage that communicates with an external periphery of the iron core and a second radial-direction cooling air passage that communicates with an internal periphery of the iron core and another radial-direction cooling air passage provided in a section from an internal periphery of the iron core to the specific point.

4. A generator, comprising:

a casing;

a rotor accommodated in said casing and rotatably supported in said casing; and a stator accommodated in said casing and disposed with a clearance around said rotor;

wherein said stator is constructed of an iron core, formed of a plurality of steel sheets laminated such that any two adjacent ones of said steel sheets contact each other, and a coil wound around said iron core;

wherein said casing comprises first and second cooling oil entrances, first and second cooling oil exits, and a first cooling oil passage constructed of at least two annular passages that surround said stator, said at least two annular passages communicating with each other at said first cooing oil entrance and said first cooling oil exit;

wherein said iron core comprises a second cooling oil passage that passes through inside of said iron core and communicates with said second cooling oil entrance and said second cooling oil exit; and wherein said second cooling oil passage comprises at least two radial-direction cooling oil passages provided substantially in a radial direction and an axial-direction cooling oil passage provided substantially in an axial direction.

5. The generator of claim 4, wherein said second cooling oil passage is formed of a plurality of kinds of steel sheets, each of said kinds of steel sheets having at least one kind of holes and grooves formed by press processing.

6. A generator, comprising:

a casing;

a rotor accommodated in said casing and rotatably supported in said casing; and a stator accommodated in said casing and disposed with a clearance around said rotor;

wherein said stator is constructed of an iron core, formed of a plurality of steel sheets laminated such that any two adjacent ones of said steel sheets contact each other, and a coil wound around said iron core;

wherein said casing comprises a cooling air entrance and a cooling air exit;

wherein said iron core comprises a cooling air passage that passes through inside of said iron core and communicates between said cooling air entrance and said cooling air exit via a clearance between an internal periphery of said iron core and an external periphery of said rotor; and wherein said cooling air passage comprises a first radial-direction cooling air passage extending linearly from an external periphery of said iron core to a second radial-direction cooling air passage, said second radial-direction cooling air passage being noncollinear with respect to said first radial-direction cooling air passage and extending linearly from the internal periphery of said iron core such that said first and second radial-direction cooling air passages communicate with each other.

7. The generator of claim 6, wherein said cooling air passage is formed of a plurality of kinds of steel sheets, wherein each kind of said steel sheets have at least one kind of holes and grooves formed by press processing.

8. A cooling structure which cools a stator of a generator, wherein:

a casing comprises first and second cooling oil entrances, first and second cooling oil exits, and a first cooling oil passage constructed of at least two annular passages that surround an iron core, said at least two annular passages communicating with each other at said first cooing oil entrance and said first cooling oil exit;

wherein said iron core is formed of a plurality of steel sheets laminated such that any two adjacent ones of said steel sheets contact each other;

wherein said iron core comprises a second cooling oil passage that passes through inside of said iron core and communicates with said second cooling oil entrance and said second cooling oil exit; and wherein said second cooling oil passage comprises at least two radial-direction cooling oil passages provided substantially in a radial direction and an axial-direction cooling oil passage provided substantially in an axial direction.

9. A cooling structure which cools a rotor of a generator, wherein:

a casing of the generator comprises a cooling air entrance and a cooling air exit;

an iron core of the generator is formed of a plurality of steel sheets laminated such that any two adjacent ones of said steel sheets contact each other;

said iron core comprises a cooling air passage that passes through inside of said iron core and communicates between said cooling air entrance and said cooling air exit via a clearance at an internal periphery of said iron core; and said cooling air passage comprises a first radial-direction cooling air passage extending linearly from an external periphery of said iron core to a second radial-direction cooling air passage, said second radial-direction cooling air passage being noncollinear with respect to said first radial-direction cooling air passage and extending linearly from the internal periphery of said iron core such that said first and second radial-direction cooling air passages communicate with each other.

* * * * *